No. 738,257. PATENTED SEPT. 8, 1903.
S. TRIVETT & E. CUMMINGS.
APPARATUS FOR FEEDING LIQUID FUEL TO STOVES.
APPLICATION FILED AUG. 21, 1902.
NO MODEL.

Witnesses
C. H. Walker.
B. F. Hemphill

Inventors
Squire Trivett and
Enoch Cummings
By H. W. Stackpole
Their Attorney

No. 738,257.  
Patented September 8, 1903.

UNITED STATES PATENT OFFICE.

SQUIRE TRIVETT AND ENOCH CUMMINGS, OF CLAY CENTER, KANSAS.

APPARATUS FOR FEEDING LIQUID FUEL TO STOVES.

SPECIFICATION forming part of Letters Patent No. 738,257, dated September 8, 1903.

Application filed August 21, 1902. Serial No. 120,589. (No model.)

*To all whom it may concern:*

Be it known that we, SQUIRE TRIVETT and ENOCH CUMMINGS, citizens of the United States, residing at Clay Center, in the county of Clay and State of Kansas, have invented certain new and useful Improvements in Apparatus for Feeding Liquid Fuel to Stoves, of which the following is a specification.

Our invention relates to apparatus for feeding liquid fuel to stoves; and its object is to provide a simple, inexpensive, and durable construction which will feed a regulated quantity of petroleum or other hydrocarbon to the stove and which may be conveniently applied to either a cooking or heating stove or readily removed therefrom.

Further objects and advantages will be apparent when considered in connection with the following description and the accompanying drawings, in which—

Figure 1:
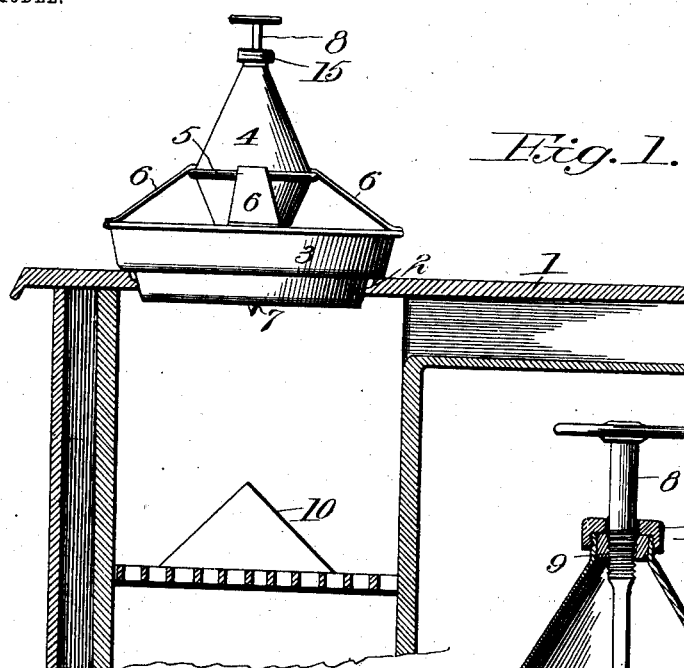
Figure 2:
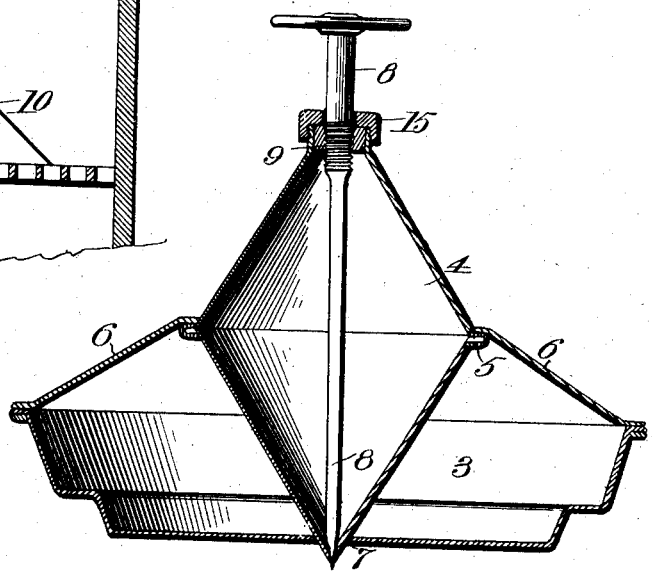
Figure 3:
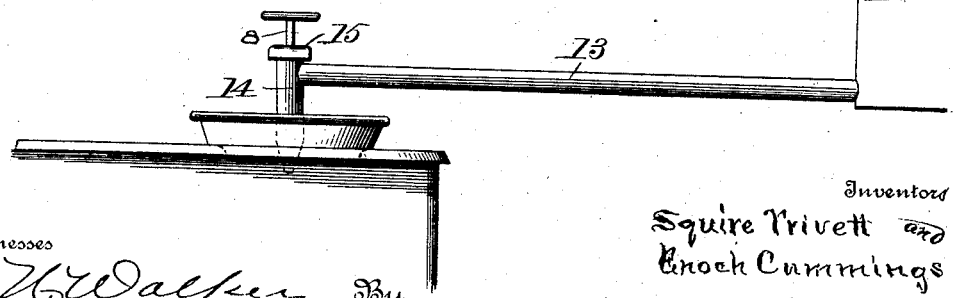

Figure 1 is a side elevation of the device applied to a stove, the stove being shown in section. Fig. 2 is a vertical section of the device detached from the stove. Fig. 3 is a modified arrangement of feeding apparatus, with the tank containing the fuel located away from the stove.

In carrying out our invention the device may be applied to either a cooking or heating stove of any design; but the preferred embodiment is shown in Fig. 1 as being arranged on a cook-stove 1, having the usual stove-hole 2, over which the pan and tank containing the fuel are placed. The receptacle or pan 3 is of a size and shape to conveniently fit within the stove-hole and is adapted to contain water to prevent the petroleum in the tank from becoming overheated and causing an explosion.

Secured to the center of the pan 3 is a tank 4, of double-cone shape, the apices of the cones being at the top and bottom, and from the central widened portion 5 extend stays 6 to engage the periphery of the pan 3. By converging the ends of the tank the lower end, which is adjacent to the fire in the stove, will present a very small surface to the water contained in the pan and a small amount of fuel around such surface, thus diminishing the liability of explosion, as well as providing a suitable seat for a needle-valve presently to be described. The upper end of the tank provides a suitable casing for the stem of the valve and its operating-handle. The lower end of the tank 4 projects through a central aperture in the pan 3, as at 7, and this end is provided with an aperture in which the needle 8 is adapted to seat, such needle extending up through the tank, its stem having the usual threads to engage the threads 9 in the upper end of the tank. When the cover of the stove has been removed and the pan placed in stove-hole, the water is poured in the pan and the needle-valve opened, which permits the oil to flow in regulated quantities, according to the intensity of the heat desired, to a small amount of bituminous coal or a cone of asbestos 10, which has previously been placed in the stove.

In Fig. 3 the tank 12 containing the oil is placed some distance from the stove, and the fuel is conducted thereto through the pipe 13, having an elbow and depending valve-casing 14, containing the needle 8, and the end of the casing with said needle-point seated therein projects through the pan 3, as in Fig. 1. This arrangement is more particularly adapted to furnaces when the intensity of the heat is very great, the water in the pan 3 being sufficient to keep the small quantity of oil in the valve-casing cool.

The oil may be introduced to the tank shown in Fig. 1 through the opening in the top by unscrewing the cap 15 and removing the valve-stem.

This device being portable, it is readily removed when ordinary fuel is used in the stove.

Having thus described our invention, what we claim, and desire to secure by Letters Patent, is—

1. A device of the class described comprising a portable appliance composed of a pan adapted to fit within a stove-hole and contain water, a fuel-receptacle supported in the pan and provided with converging walls which terminate in a valve-seat and project through the pan, a valve adapted to engage the projecting seat, and means extending through the top of the receptacle for operating the valve.

2. A device of the class described comprising a water-pan adapted to fit in the stove-hole, a double-cone shaped fuel-receptacle supported in the pan and having its lower apex projecting through the bottom of the pan, a valve adapted to seat in the lower apex and having a threaded engagement with the upper apex, substantially as specified.

In testimony whereof we affix our signatures in presence of two witnesses.

SQUIRE TRIVETT.
ENOCH CUMMINGS.

Witnesses:
B. F. HEMPHILL,
A. H. WEHMHOFF.